United States Patent [19]

Fueki

[11] Patent Number: 5,339,412
[45] Date of Patent: Aug. 16, 1994

[54] ELECTRONIC FILING SYSTEM USING A MARK ON EACH PAGE OF THE DOCUMENT FOR BUILDING A DATABASE WITH RESPECT TO PLURALITY OF MULTI-PAGE DOCUMENTS

[75] Inventor: Kazumasa Fueki, Urawa, Japan

[73] Assignee: Ricoh Company, Ltd., Tokyo, Japan

[21] Appl. No.: 164,883

[22] Filed: Dec. 13, 1993

Related U.S. Application Data

[63] Continuation of Ser. No. 610,573, Nov. 8, 1990, abandoned.

[30] Foreign Application Priority Data

Nov. 20, 1989 [JP] Japan .................. 1-301774

[51] Int. Cl.$^5$ .................... G06F 7/10; G06F 15/40
[52] U.S. Cl. .................... 395/600; 382/48; 382/61; 364/920.7; 364/963; 364/963.4; 364/963.5; 364/DIG. 2
[58] Field of Search ............... 395/600; 382/48, 61; 358/403

[56] References Cited

U.S. PATENT DOCUMENTS

| | | | |
|---|---|---|---|
| 3,853,399 | 12/1974 | Walsh | 355/64 |
| 4,283,621 | 8/1981 | Pembroke | 235/375 |
| 4,408,181 | 10/1983 | Nakayama | 382/61 |
| 4,604,653 | 8/1986 | Shimizu | 358/403 |
| 4,652,733 | 3/1987 | Eng et al. | 235/462 |
| 4,760,606 | 7/1988 | Lesnick et al. | 382/48 |
| 4,941,125 | 7/1990 | Boyne | 395/600 |
| 5,084,769 | 1/1992 | Miura | 358/403 |
| 5,109,439 | 4/1992 | Froessl | 382/61 |
| 5,185,821 | 2/1993 | Yoda | 382/61 |

FOREIGN PATENT DOCUMENTS

| | | |
|---|---|---|
| 0117336 | 9/1984 | European Pat. Off. . |
| 0170469 | 2/1986 | European Pat. Off. . |
| 0251237 | 1/1988 | European Pat. Off. . |
| 0274571 | 7/1988 | European Pat. Off. . |
| 3824976 | 2/1989 | Fed. Rep. of Germany . |

*Primary Examiner*—Alyssa H. Bowler
*Assistant Examiner*—Meng-Ai T. An
*Attorney, Agent, or Firm*—Mason, Fenwick & Lawrence

[57] ABSTRACT

An electronic filing system files one of a plurality of documents each having a mark associated with the document for recognizing each document. The electronic filing system includes an input part for inputting retrieval information for one or a plurality of documents which are to be registered prior to a document registration process, a database part for managing the retrieval information input from the input part, an image scanner for scanning a document and outputting image data related to the scanned document, a storage for storing the image data received from the image scanner, a recognition part for recognizing the mark on the document based on the image data stored in the storage, and a controller for making a database building with respect to an arbitrary document based on the mark of the arbitrary document recognized by the recognition part and the retrieval information which is managed in the database for each document when carrying out the document registration process.

9 Claims, 4 Drawing Sheets

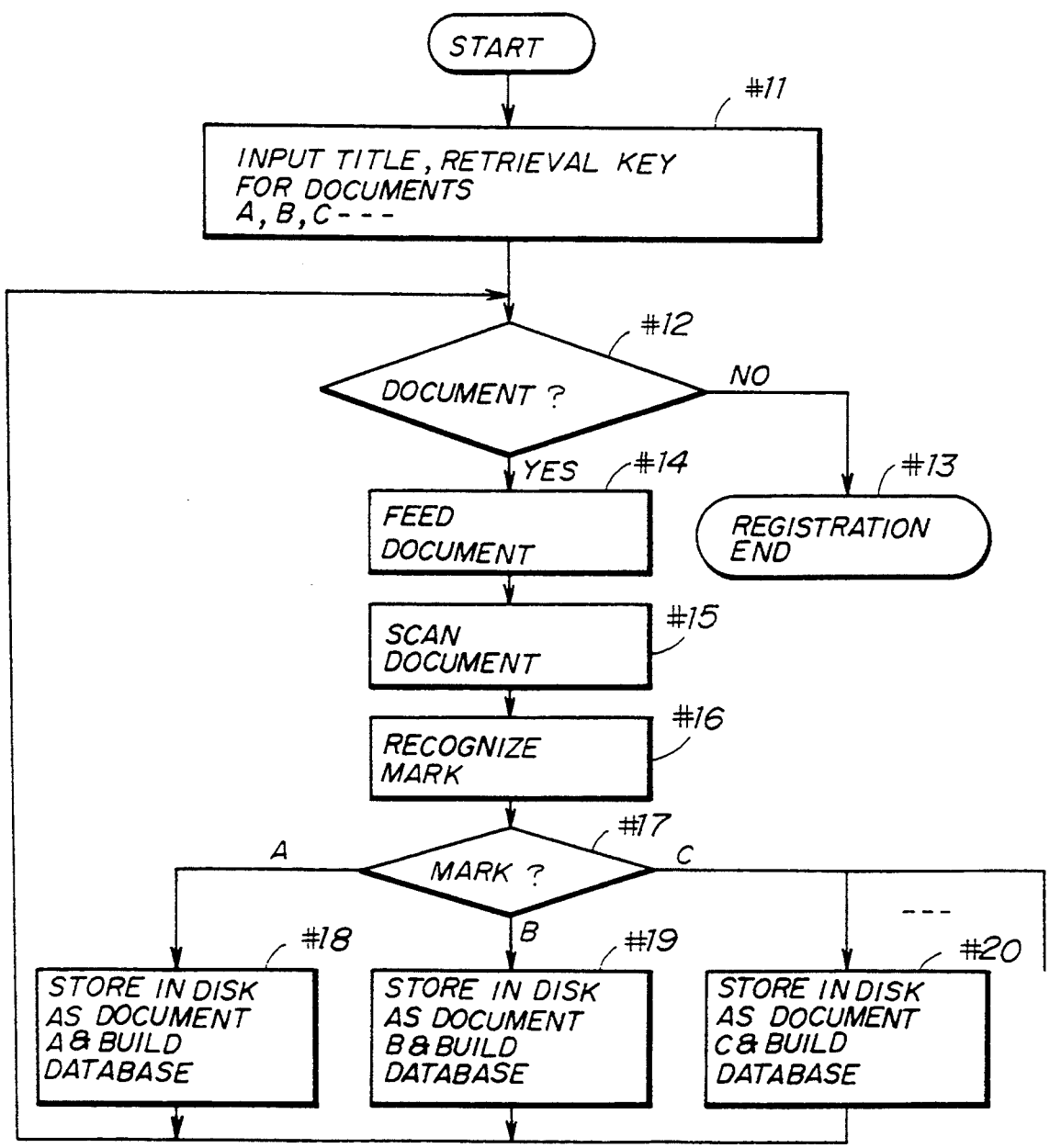

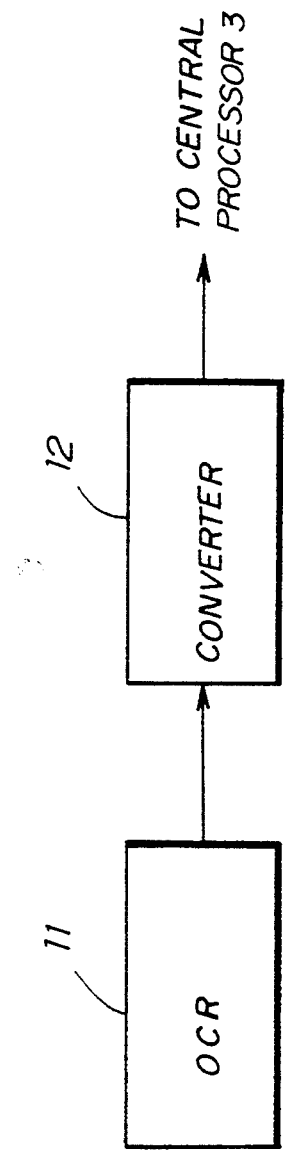

ELECTRONIC FILING SYSTEM USING A MARK ON EACH PAGE OF THE DOCUMENT FOR BUILDING A DATABASE WITH RESPECT TO PLURALITY OF MULTI-PAGE DOCUMENTS

This application is a continuation of U.S. patent application Ser. No. 07/610,573, filed Nov. 8, 1990 now abandoned.

BACKGROUND OF THE INVENTION

The present invention generally relates to electronic filing systems, and more particularly to an electronic filing system having a database building function and capable of processing image data including storage, retrieval, display and printing of the image data.

The electronic filing system refers to various information processing systems such as personal computers, office computers, desk top publishing (DTP) systems and data processing systems having image data processing functions.

When filing image data in the conventional electronic filing system, the image data is input to the system from an image scanner for each document. The input image data is stored in a secondary memory means, and at the same time, retrieval information related to the stored image data such as the document title is also input to a database.

When inputting related image data such as the case where one document is made up of a plurality of pages, the retrieval information and the input image data are related by the operator. For this reason, there is a problem in that a registration process cannot be carried out simply and quickly.

In order to eliminate the above described problem, it is conceivable to carry out an automatic database building using an optical character reader (OCR). According to this conceivable system, a predetermined area is recognized by the OCR, and a recognition result is registered as the retrieval information.

The majority of documents include a plurality of pages of image data. For this reason, it is desirable to file the image data related to a plurality of pages of one document in such a manner that the image data can be stored and retrieved as one related data. However, the image data related to the plurality of pages of one document may not necessarily always include the data which is required as the retrieval information. In this case, it is impossible to automatically relate the data for each page of the document.

In other words, it can be said that the document in general consists of a plurality of pages in most cases. Furthermore, in most cases, the data required as the retrieval information is not included in all of the image data related to the plurality of pages of the document. In addition, even when the data required as the retrieval information is included in all of the image data related to the plurality of pages of the document, the image data related to the plurality of pages are processed as mutually independent documents unless the image data include data for indicating that the image data relate to the same document for use as the retrieval information. But it is evident that it is desirable to realize a database structure such that the document including a plurality of pages is processed as a single document.

The conventional electronic filing system can only register one document in one document registration process. On the other hand, even in the conceivable system which uses the OCR for recognizing each document, the data required for making the retrieval information is rarely included in all the related image data. Therefore, there are problems in that the burden on the operator increases and the processing efficiency upon document registration is poor.

SUMMARY OF THE INVENTION

Accordingly, it is a general object of the present invention to provide a novel and useful electronic filing system in which the problems described above are eliminated.

Another and more specific object of the present invention is to provide an electronic filing system for filing one of a plurality of documents, where each document has a mark associated with the document for recognizing each document, and the electronic filing system comprises input means for inputting retrieval information for one or a plurality of documents which are to be registered prior to a document registration process, database means for managing the retrieval information input from the input means, image scanner means for scanning a document and outputting image data related to the scanned document, storage means for storing the image data received from the image scanner means, recognition means for recognizing the mark on the document based on the image data stored in the storage means, and control means coupled to each of the input means, the database means, the image scanner means, the storage means and the recognition means for making a database building with respect to an arbitrary document based on the mark of the arbitrary document recognized by the recognition means and the retrieval information which is managed in the database means for each document when carrying out the document registration process. According to the electronic filing system of the present invention, even when one or a plurality of documents are to be filed and each document consists of a plurality of pages, it is possible to store and retrieve the documents as one data unit. In other words, a plurality of documents having a plurality of pages can be automatically registered at the same time, and the document registration process can be made by a simple operation at a high speed.

Other objects and further features of the present invention will be apparent from the following detailed description when read in conjunction with the accompanying drawings.

BRIEF DESCRIPTION OF THE DRAWINGS

FIG. 3 is a flow chart for explaining a document registration process of the embodiment;

FIG. 5 is a system block diagram showing an embodiment of a mark recognition means of the embodiment shown in FIG. 1.

DESCRIPTION OF THE PREFERRED EMBODIMENTS

Figure 1:
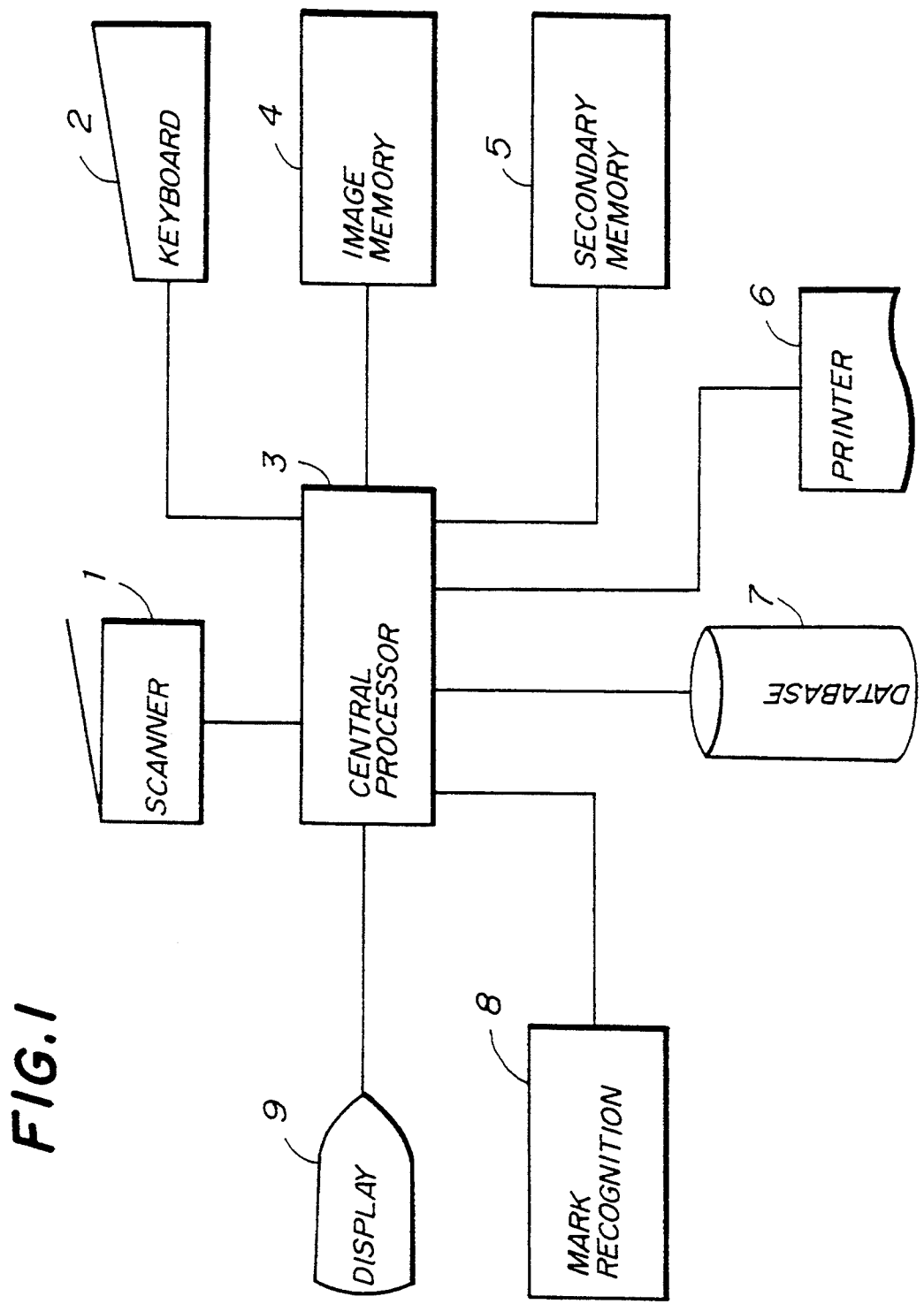
FIG. 1 is a system block diagram showing an essential part of an embodiment of an electronic filing system according to the present invention.
Figure 2:
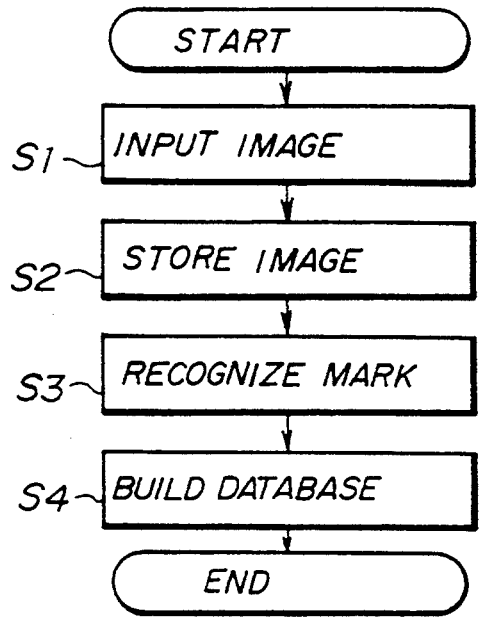
FIG. 2 is a diagram for explaining a database building procedure.

FIG. 1 shows an essential part of an electronic filing system according to the present invention, and FIG. 2 is a diagram for explaining a database building procedure of this embodiment.

In order to facilitate the understanding of the subject matter of the present invention, a description will first be given of an automatic categorizing process of this embodiment.

A step S1 shown in FIG. 2 inputs image data of a document which is to be processed by reading the document by an image scanner 1 shown in FIG. 1.

A step S2 shown in FIG. 2 stores the input image data. The input image data is temporarily stored in an image memory 4 shown in FIG. 1, but is thereafter stored in a secondary memory device 5.

A step S3 shown in FIG. 2 recognizes marks by recognizing a predetermined area of the document by a mark recognition means 8 shown in FIG. 1.

A step S4 shown in FIG. 2 finally makes a database building with respect to the image data stored in the secondary memory device 5 based on the recognition result of the mark recognition means 8.

The database building procedure shown in FIG. 2 can be summarized as follows. That is, a mark such as an alphabet and number is written in the predetermined area of each page of the document. This predetermined area is usually an area of the document unrelated to the actual content of the document, and corresponds to an unused margin area of the page, for example. The mark written on each page of the document is recognized by the mark recognition means 8, and the database building is made by taking those image data related to pages which are written with the same mark as one document unit. As a result, unlike the conventional electronic filing system, it is unnecessary to carry out the document registration process for each document and the document registration process can be carried out at a high speed.

A description will now be given of the structure of the embodiment shown in FIG. 1. The electronic filing system shown in FIG. 1 includes the image scanner 1, a keyboard 2, a central processor 3, the image memory 4, the secondary memory device 5, a printer 6, a database part 7, the mark recognition means 8, and a display device 9.

The image scanner 1 optically reads the document image and converts the read image into electrical image data signal. The keyboard 2 includes various control keys for editing and keys for inputting character codes. In this embodiment, the keyboard 2 is used as an input means for inputting titles as document names, retrieval information and marks which are written beforehand at a predetermined position of each document. The marks are input for recognizing each document.

The central processor 3 controls the entire operation of the electronic filing system. The central processor 3 includes a control means such as a central processing unit (CPU), a read only memory (ROM) for storing programs, a system memory and the like. When making the document registration, the central processor 3 temporarily stores the document title, the retrieval information, the mark for recognizing each document and the like which are input from the keyboard and carries out processes necessary for the document registration.

The image memory 4 temporarily stores the image data received from the image scanner 1. The secondary memory device 5 permanently stores the image data stored in the image memory 4. For example, an optical disk or the like having a large memory capacity is used for the secondary memory device 5.

The printer 6 makes a hard copy by printing the image data stored in the image memory 4 or the secondary memory device 5 onto a recording sheet.

The database part 7 manages the retrieval information which is related to the image data stored in the secondary memory device 5.

The mark recognition means 8 extracts a portion of the data stored in the image memory 4 and converts the extracted data portion into a code data having a format which can be processed in the database.

The display device 9 displays the image data stored in the image memory 4, the data in the database part 7 and the like.

The mark which is written for the registration in order to recognize each document is deleted when transferring the image data stored in the image memory 4 to the secondary memory device 5.

Of course, the management information within the database part 7 is also transferred at the same time when writing the data from this electronic filing system to the secondary memory device 5 which is a detachable optical disk or the like.

Prior to explaining the document registration of this embodiment in more detail, a description will first be given of the document registration of the conventional electronic filing system by referring to FIG. 4, so as to facilitate the understanding of this embodiment.

Generally, when making an automatic document registration in the conventional electronic filing system, the retrieval information for the document to be registered must be input prior to the actual registration operation. For this reason, only one document can be set on a document feeder of the conventional electronic filing system when making the document registration. Of course, one document may consist of one or a plurality of pages.

Figure 4:
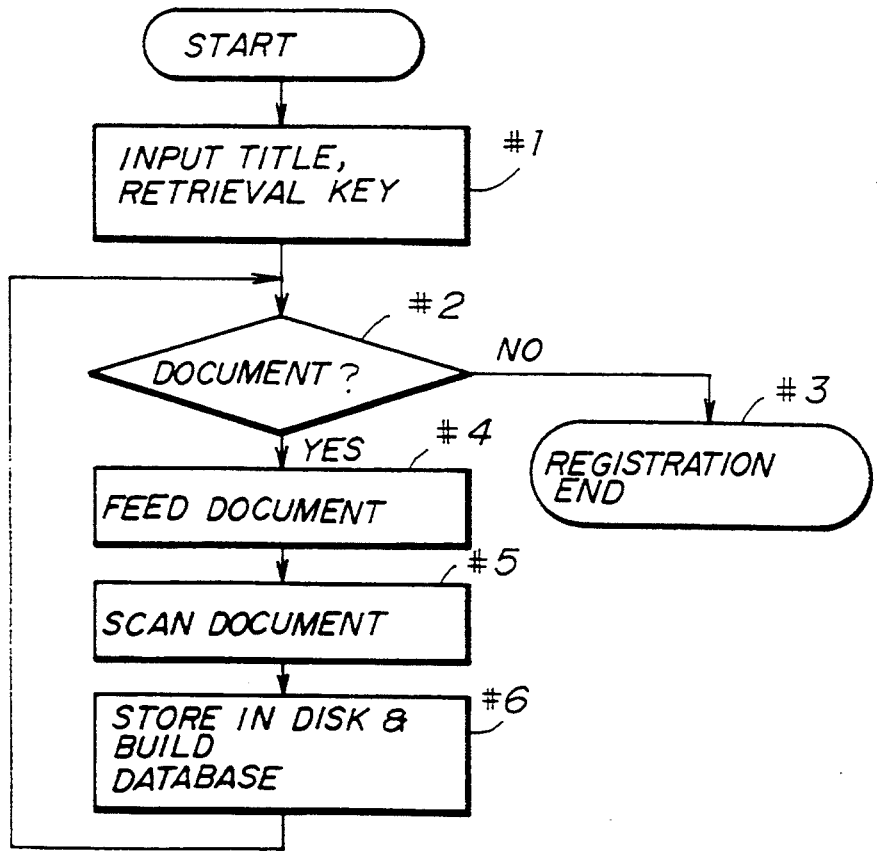
FIG. 4 is a flow chart for explaining a document registration process of a conventional electronic filing system.

FIG. 4 shows basic steps of the document registration process in the conventional electronic filing system having the database building function.

When the document registration process is started a step #1 inputs the title of the document which is to be registered and various retrieval keys. A step #2 judges whether or not a document is set on the document feeder of the electronic filing system When the judgement result in the step #2 is YES, a step #4 feeds the document which is set on the document feeder. Then, a step #5 scans the document to obtain image data related to the scanned document, and a step #6 writes the image data into an optical disk or the like and makes the database building.

After the step #6, the process returns to the step #2. The steps #4 through #6 are repeated when the judgement result in the step #2 is YES. On the other hand, when the judgement result in the step #2 is NO, a step #3 ends the document registration process.

Accordingly, in the conventional electronic filing system having the database building function, the registration is possible only for one document. In order to register a plurality of documents, it is necessary to carry out the above described document registration process for each of the documents.

On the other hand, according to this embodiment, it is possible to register a plurality of documents in one document registration process as described above.

Next, a more detailed description will be given of the document registration process of this embodiment by referring to FIG. 3. FIG. 3 shows basic steps of the document registration process in this embodiment.

In FIG. 3, a step #11 inputs from the keyboard 2 the title and various retrieval keys for a plurality of documents A, B, C, . . . which are to be registered. The retrieval information such as the title and various retrieval keys for the documents A, B, C, . . . are managed in the database part 7. Of course, the number of documents to be registered may be an arbitrary number. A step #12 judges whether or not a document is set on a document feeder of the electronic filing system. When the judgement result in the step #12 is YES, a step #14 feeds the document which is set on the document feeder. Then, a step #15 scans the document to obtain image data related to the scanned document, and a step #16 recognizes a mark on the scanned document.

A step #17 judges which one of the documents A, B, C . . . is indicated by the recognized mark. When the recognized mark indicates the document A, a step #18 stores the image data in the secondary memory device 5 as the document A and makes the database building and the process returns to the step #12. The judgement of the step #17 is made by detecting whether or not the recognized mark matches the retrieval information, that is, the title, the retrieval information and the like which are managed in the database part 7 for the document A.

In other words, the steps #12 through #17 are repeated for the next document B, and the process advances to a step #19 when the recognized mark in the step #17 indicates the document B. The step #18 stores the image data in the secondary memory device 5 as the document B and makes the database building and the process returns to the step #12.

Hence, the steps #12 through #17 are repeated for the next document C, and the process advances to a step #20 when the recognized mark in the step #17 indicates the document C. The step #20 stores the image data in the secondary memory device 5 as the document C and makes the database building and the process returns to the step #12.

The above described operation is repeated similarly until the judgement result in the step #12 becomes NO. A step #13 ends the document registration process when the judgement result in the step #12 is NO.

Therefore, in this embodiment, a mark for recognizing each document is written beforehand at a predetermined position of each document. In addition, when making the document registration, the document title and various retrieval information are input for each document which is to be registered. The database building is made for each document based on the recognition result of the mark recognition means 8. Accordingly, even when the document consists of a plurality of pages, the pages are registered as mutually related data, and furthermore, a plurality of documents can be registered in a single document registration process.

In the described embodiment, the mark recognition means 8 recognizes a portion of the data stored in the image memory 4 as the mark, by reading a specific area of the image memory 4. In addition, the recognition means 8 converts the extracted data portion into a code data having a format which can be processed in the database, that is, in the electronic filing system.

However, the mark recognition means 8 is not limited to that of the described embodiment. FIG. 5 shows an embodiment of the mark recognition means 8. In FIG. 5, an OCR 11 is used to recognize a portion of the document image as the mark, and a converter 12 converts the mark which is recognized in the OCR 11 into a code having a format which is suited for processing in the central processor 3.

Moreover, the mark for use in recognizing the document is not limited to alphanumeric characters such as alphabets and numbers. For example, the mark may be a symbol or a code such as a bar code. When the bar code is used as the mark, the mark recognition means 8 may be made up of a bar code reader and a processing part for processing an output of the bar code reader by software or hardware. For example, the bar code reader corresponds to the OCR 11 and the processing part corresponds to the converter 12 shown in FIG. 5.

When a plurality of documents have the same mark, it is possible to register these documents as one document, and the renewal of the database part 7 after the end of the data transfer to the secondary memory device 5 need only be carried out once.

Further, the present invention is not limited to these embodiments, but various variations and modifications may be made without departing from the scope of the present invention.

What is claimed is:

1. An electronic filing system for filing a plurality of documents, each document including one or more pages, each page having a mark which is uniquely associated with the document that includes that page, the mark located at a predetermined position on each page of the document, said electronic filing system comprising:

input means for inputting retrieval information for each of the plurality of documents;

data base means for storing and managing the retrieval information input form said input means;

image scanner means for scanning each page of each document and outputting image data related to the scanned pages;

storage means for storing the page image data received from said image scanner means;

recognition means for recognizing the mark on each page of each document based on a portion of the image data stored in said storage means by reading a specific storage area of said storage means; and control means coupled to said input means, said database means, said image scanner means, said storage means and said recognition means for carrying out a document registration process including building a database with respect to the plurality of documents by associating each page of each document together based upon the mark on each page recognized by said recognition means and the retrieval information which is stored in said database means for each document when carrying out the document registration process.

2. The electronic filing system as claimed in claim 1, wherein said image scanner means successively scans a plurality of documents and said control means successively builds the database with respect to each of the documents in a single document registration process.

3. The electronic filing system as claimed in claim 1, wherein said input means inputs the retrieval information which includes a title and a retrieval key for each document.

4. The electronic filing system as claimed in claim 1, said mark being selected from a group consisting of alphanumeric characters, symbols and bar codes.

5. The electronic filing system as claimed in claim 1, wherein said recognition means includes means for converting the recognized mark into a code having a format which is suited for processing in said control means.

6. The electronic filing system as claimed in claim 1, wherein said recognition means includes an optical character reader for recognizing the mark by reading a portion of each document, and a converter for converting the mark which is recognized by said optical character reader into a code having a format suited for processing in said control means.

7. The electronic filing system as claimed in claim 1, wherein said storage means includes an image memory for temporarily storing the image data received from said image scanner means under a control of said control means, and a secondary memory device for permanently storing the image data stored in said image memory under a control of said control means at an end of the document registration process.

8. The electronic filing system as claimed in claim 7, wherein said control means includes means for erasing a portion of the image data stored in said image memory when transferring the image data stored in said image memory into said secondary memory device, said portion corresponding to the mark on the document.

9. The electronic filing system as claimed in claim 7, wherein said control means also transfers the retrieval information which is related to the arbitrary document to said secondary memory device at the end of the document registration process.

* * * * *